(12) United States Patent
Conner et al.

(10) Patent No.: US 9,372,768 B2
(45) Date of Patent: Jun. 21, 2016

(54) DEBUG INTERFACE

(71) Applicant: Intel Corporation, Santa Clara, CA (US)

(72) Inventors: Jeremy Conner, Seattle, WA (US); Sabar Souag, Vancouver, WA (US); Karunakara Kotary, Bangalore (IN); Victor Ruybalid, Beaverton, OR (US); Noel Eck, Portland, OR (US); Ramana Rachakonda, Austin, TX (US); Sankaran Menon, Austin, TX (US); Lance Hacking, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 14/141,099

(22) Filed: Dec. 26, 2013

(65) Prior Publication Data

US 2015/0186232 A1    Jul. 2, 2015

(51) Int. Cl.
*G06F 11/00* (2006.01)
*G06F 11/22* (2006.01)
*G06F 11/26* (2006.01)

(52) U.S. Cl.
CPC ............ *G06F 11/2268* (2013.01); *G06F 11/26* (2013.01)

(58) Field of Classification Search
USPC .......................................................... 714/45
See application file for complete search history.

(56) References Cited

U.S. PATENT DOCUMENTS

| | | | |
|---|---|---|---|
| 2005/0102572 A1* | 5/2005 | Oberlaender | G06F 17/5022 714/29 |
| 2005/0251705 A1* | 11/2005 | Liu | G06F 11/366 714/48 |
| 2010/0268990 A1 | 10/2010 | Xu et al. | |
| 2011/0041017 A1 | 2/2011 | Zhong et al. | |
| 2013/0339790 A1* | 12/2013 | Menon | G06F 11/2733 714/30 |
| 2014/0359374 A1* | 12/2014 | Shirlen | G06F 11/3466 714/45 |

* cited by examiner

*Primary Examiner* — Sarai Butler
(74) *Attorney, Agent, or Firm* — International IP Law Group, P.L.L.C.

(57) ABSTRACT

Techniques of debugging a computing system are described herein. The techniques may include generating debug data at agents in the computing system. The techniques may include recording the debug data at a storage element, wherein the storage element is disposed in a non-core portion of the circuit interconnect accessible to the agents.

25 Claims, 9 Drawing Sheets

400

800

DEBUG INTERFACE

TECHNICAL FIELD

This disclosure relates generally to techniques for debugging a computing device. Specifically, this disclosure relates to debugging software and firmware agents of a computing device.

BACKGROUND ART

Computing systems may include integrated circuits, systems on a chip (SOCs), and other circuit components configured to integrate multiple microcontrollers. Each of the microcontrollers may have their own firmware components as well as their own operating system driver components. Many of these microcontroller firmware and driver components may encounter errors. Each of the microcontroller firmware and driver components may be associated with their own mechanism to provide debug data related to a given error, wherein the concurrent and time correlated debug data is used to determine the cause of such errors.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for receiving debug data from a plurality of agents in a computing system. Traditional agent debugging techniques have depended on a mother board or on the presence of connectors such as Universal Serial Bus (USB), for example, requiring individual coupling from each of the agents to a given connector to debug agents based on debug data. The techniques described herein include a register accessible by a plurality of agents, including driver agents operating in the operating system and firmware agents operating on respective controllers, integrated circuits, systems on a chip (SOCs), and the like. The access to the register enables debug data to be recorded within the register based on the location of the register in a non-core location within the computing system. A non-core location, as referred to herein, is any location other than a processing unit such as a central processing unit (CPU). The disposition of a register in a non-core location enables agents of both firmware and software to communicate with the register.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Figure 1:
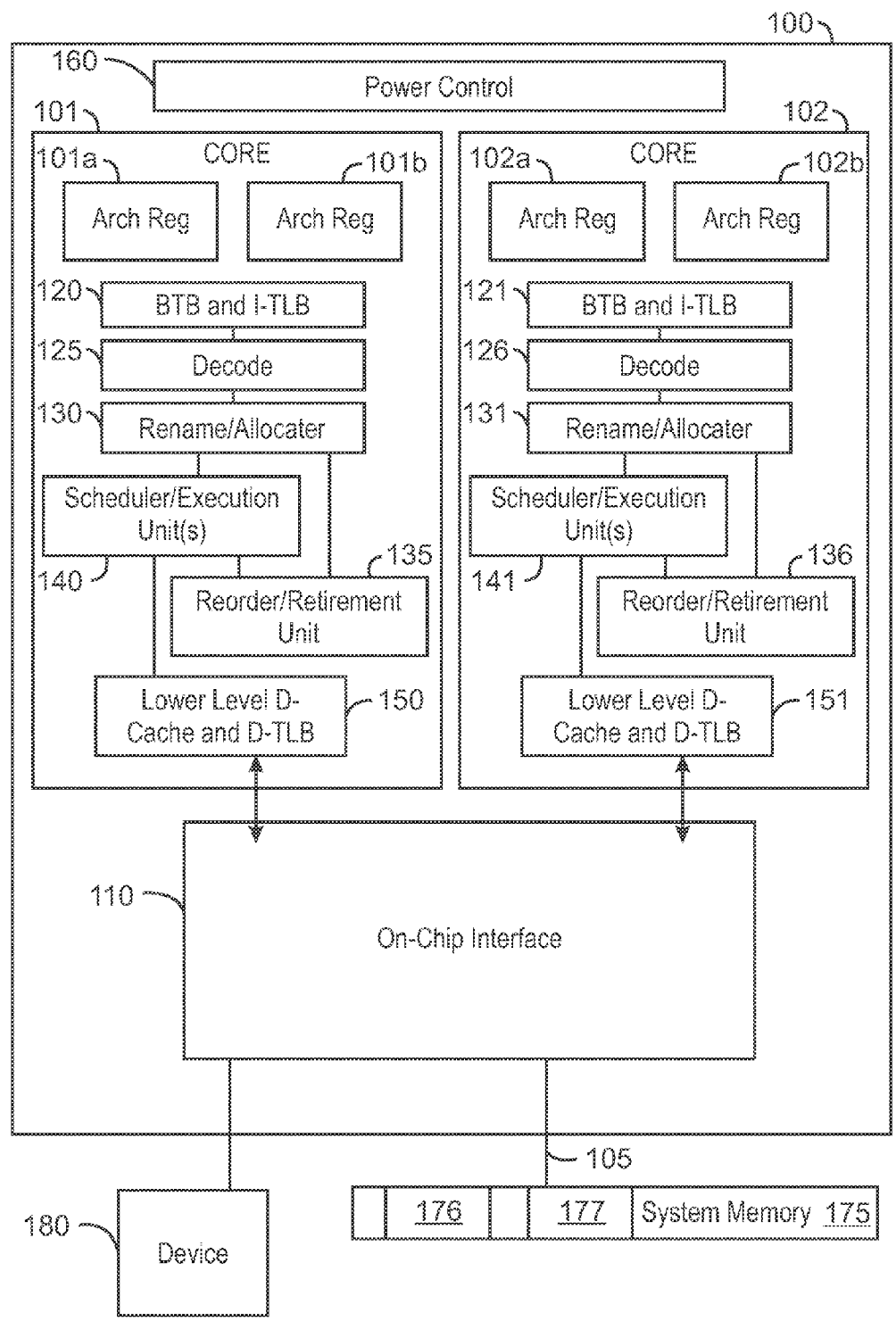
FIG. 1 illustrates an embodiment of a block diagram for a computing system including a multicore processor.

FIG. 1 illustrates an embodiment of a block diagram for a computing system including a multicore processor. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that are symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 includes any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
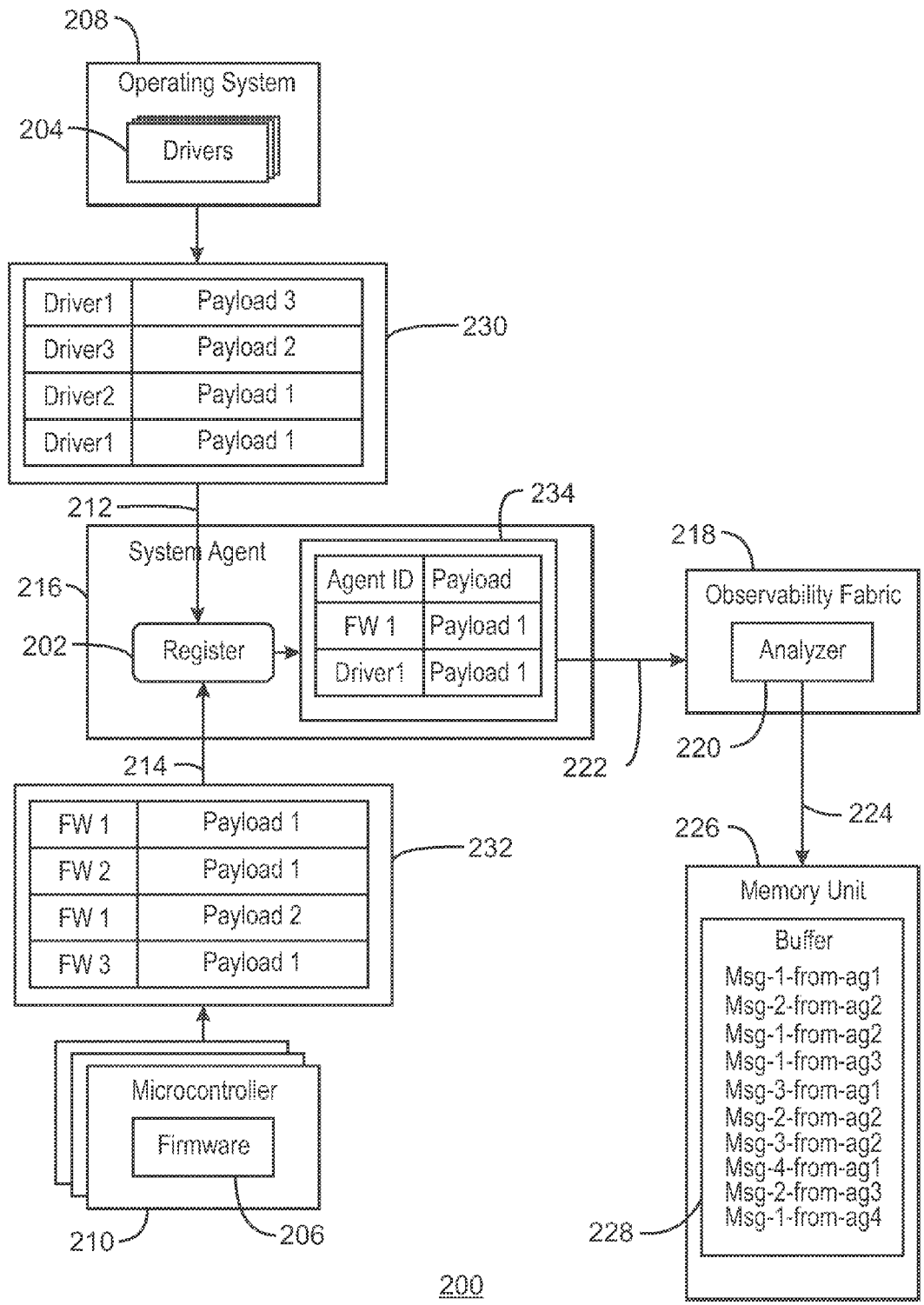
FIG. 2 is a block diagram illustrating a computing system including a storage element to receive debug data.

FIG. 2 is a block diagram illustrating a computing system including a storage element to receive debug data. In one embodiment, the storage element is a register, such as the register 202 illustrated in FIG. 2, or any other suitable memory element. The computing system 200 includes the register 202 configured to receive debug data from agents 204, 206. The agents include drivers 204 operating within an operating system 208, and one or more firmware 206 operating on one or more microcontrollers 210. The agents 204, 206 may be code held in memory to be executed on a processing element and/or code collocated in local storage to be executed by a processing element such as a processor, microcontroller, and the like. As indicated by the arrows 212 and 214, interconnects may be configured to provide debug data to the register 202 from the drivers 204 and firmware 206.

The register 202, in one embodiment, is disposed within a non-core portion of the computing system 200. For example, the computing system 200 may include a processing core (not shown), or multiple processing cores, wherein register 202 is disposed remote from the processor core or processing cores. In embodiments, the register 202 may be disposed within a system agent 216. The system agent 216 is non-core logic, at least partially comprising hardware logic, such as a circuit interconnect, configured to enable data to be transferred from the agents 204 and 206 to the register 202.

The drivers 204 operable on the operating system 208 may be device drivers configured to operate a particular type of device associated with the computing system 200. For example, the drivers 204 may include a graphics driver configured to operate a graphical display unit of the computing system 200. Other examples of drivers 204 may include an audio driver, an imaging driver, a security engine driver, an extensible host controller interface (xHCI) driver, a basic input output (BIOS) driver, and the like.

The firmware 206 associated with a given microcontroller 210 may be used for system control. For example, the firmware 206 may be from the power management controller in the computing system 200. Other examples of firmware 206 may include graphics firmware, security firmware, audio firmware, camera firmware, and the like.

The drivers 204 and the firmware 206 may be referred to herein as "agents." The agents, either driver agents or firmware agents, are each configured to emit debug messages such as post codes, trace logs, and the like. A driver agent, as referred to herein, may include program code executable by a processor, or processing device, to implement operations associated with an operating system, and to generate debug data. A firmware agent, as referred to herein, may include logic, at least partially comprising hardware logic executed at a microcontroller. As a result, in one embodiment, use of the term "agent" refers to any grouping of logic to emit such debug-like messages. The debug messages may be used to identify system issues such as hangs during a boot process of the computing system 200, power management flows within the computing system 200, and the like, wherein many different agents are interacting within the computing system 200.

In embodiments, agents 204, 206 provide debug messages to the register 202 in a predefined format. For example, the predefined format may be configured such that the debug messages may be recorded in the register 202. In some embodiments, each agent may provide an extensible markup language (XML) document to describe debug messages to debug mechanism discussed in more detail below.

In embodiments, the computing system 200 includes an observability fabric 218 having analyzer logic 220. The observability fabric 218 is a network of multiplexers configured to observe internal signals. For example, the register 202 changes value upon recording debug data from one or more of the agents 204, 206. In this scenario, the observability fabric 218 detects a change in the register due to the debug data recorded in the register 202. In one embodiment, the debug data is provided from the register 202 to the observability fabric 218 as indicated by the arrow 222. The analyzer logic 220 compresses the debug data and timestamp the debug data before providing the debug data to a memory unit 216 indicated by the arrow 224.

In some embodiments, the memory unit 226 is a volatile memory (e.g. random access memory (RAM), static random access memory (SRAM), dynamic random access memory (DRAM), and the like) unit configured to store the debug data in a scalable buffer 228. In one embodiment, the buffer 228 is a circular buffer configured to record the debug data such that the debug data is recorded in a circular manner as the debug data is received from agents 204, 206 throughout the computing system 200. In some embodiments, space in the memory unit 226 is reserved via a basic input output system (BIOS) for debug data to be recorded in the buffer 228. In this scenario, the BIOS reserves space in the memory unit 226 such that the space is visible to the agents 204, 206, but that the operating system 208 does not use this memory for other operations. In some embodiments, the BIOS is configured to trigger debug data to be provided from a given firmware agent 206 to the register 202.

In embodiments, the register 202 is configured to aggregate the debug data from each of the plurality of agents 204, 206. As indicated at blocks 230 and 232, the debug data is be provided to the register 202 as payloads associated with a given agent. As illustrated in block 230, the payloads are associated with agent identifiers (Agent ID) that are unique identifiers of the driver agents 204, such as "Driver 1," "Driver 2," "Driver 3" and so on. The payloads are numbered sequentially as each is generated at a respective agent. As illustrated at block 232 in FIG. 3, the firmware agents also provide payloads numbered sequentially as received from a respective firmware agent, such as the firmware agent 206, having an associated Agent ID associated with the firmware agent from which a given payload originates, such as "FW 1," FW 2," "FW 3," and so on. At block 234, a format of the data provided to the observability fabric 218 from the register 202 is provided. As illustrated at block 310, the register 202 aggregates the debug data received from each agent by identifying payloads with a given Agent ID indicated the agent generating the debug data.

In some embodiments, the debug data is sampled at a clock edge associated with the computing system 200. Rather than providing the debug data in an aggregate format as indicated at block 234 of FIG. 2, the register 202 may be sampled by the observability fabric 218 upon a clock cycle. The wherein the most recent debug data recorded in the register is provided to the observability fabric 218 at each clock cycle.

Figure 3:
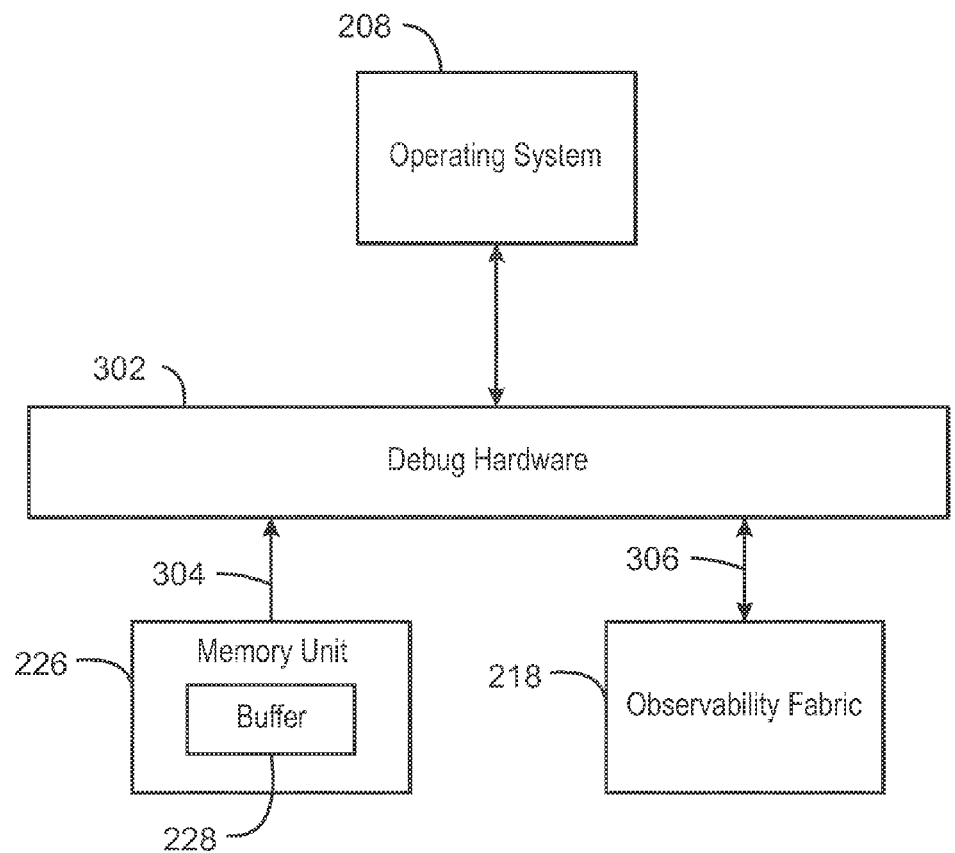
FIG. 3 is a block diagram illustrating a debug mechanism and an external hardware device configured to receive the debug data stored in the memory unit.

FIG. 3 is a block diagram illustrating a debug mechanism and an external hardware device configured to receive the debug data stored in the memory unit. The debug mechanism 300 400 may include the external hardware device 302 configured to communicate with the operating system 208 to determine debug data in the buffer 228 of the memory unit 226. In embodiments, the external hardware device 302 comprises debug logic such as Joint Test Action Group (JTAG) logic configured to receive debug data from the memory unit 226, as indicated by the arrow 304, and performs debug operations. In this scenario, the external hardware device receives debug data using JTAG pins such as test data in (TDI), test data out (TDO), test clock (TCK), test mode select (TMS), test reset (TRST), and the like. As discussed in more detail below, in embodiments JTAG pins capture samples of debug data at discrete levels. The external hardware device 302 configures debug architecture, such as the observability fabric 218 and the memory unit 228, using the debug logic, such as the JTAG logic discussed above, and as illustrated by the arrow 306 in FIG. 3.

Figure 4:
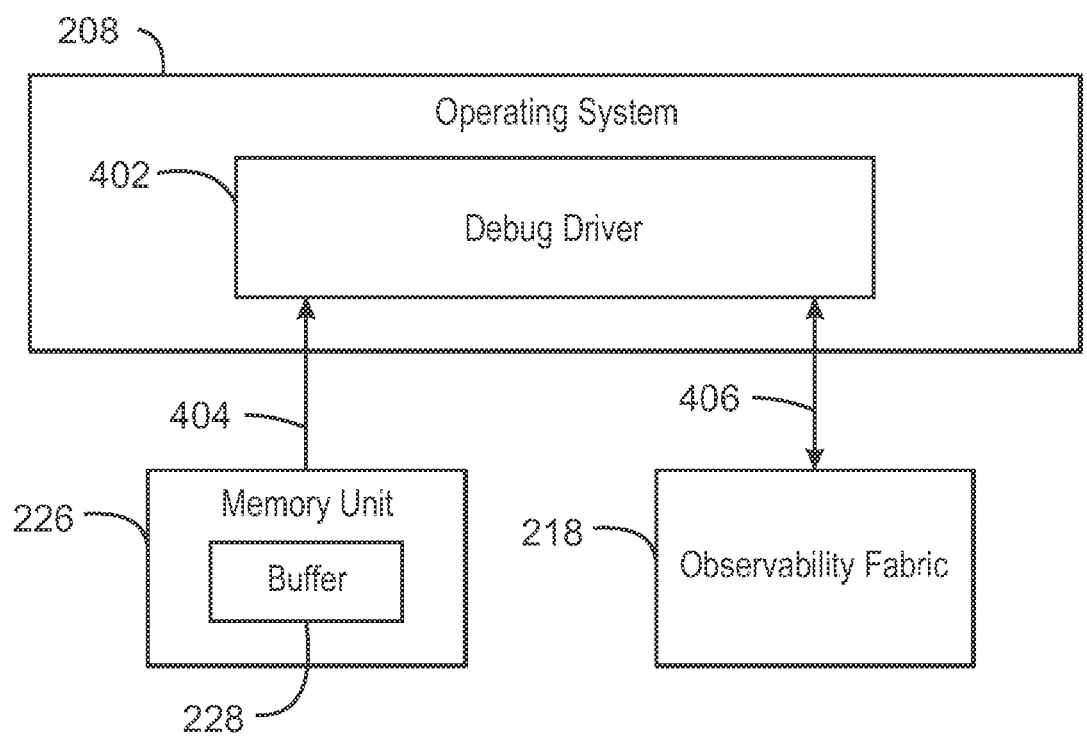
FIG. 4 is a block diagram illustrating a debug mechanism and a debug driver of the operating system configured to receive the debug data stored in the memory unit.

FIG. 4 is a block diagram illustrating a debug mechanism and a debug driver of the operating system configured to receive the debug data stored in the memory unit. In contrast to FIG. 3 discussed above wherein an external hardware device is used to receive debug data and configure debug architecture, such as the observability fabric 218 and the memory unit 226, a host-based debug driver 402 may be used to configure the debug architecture and receive debug data without an external hardware device 202. As illustrated in FIG. 4, in embodiments the operating system 208 includes the debug driver 402 configured to determine debug data in the buffer 228 of the memory unit 226. In embodiments, the debug driver 402 comprises debug logic such as Joint Test Action Group (JTAG) logic configured to receive debug data from the memory unit 226, as indicated by the arrow 404, and performs debug operations. The debug driver 402 configures the observability fabric 218 to properly capture the register, as illustrated by the arrow 406.

The operating system 208 may be configured to scan for debug data in the memory unit 226. In some embodiments, the computing system includes a trace capture analysis module (not shown) in the operating system 208 configured to direct the driver 402 to periodically scan the memory unit 226 for debug data, decode the debug data, and identify an error in one or more of the agents.

Figure 5:
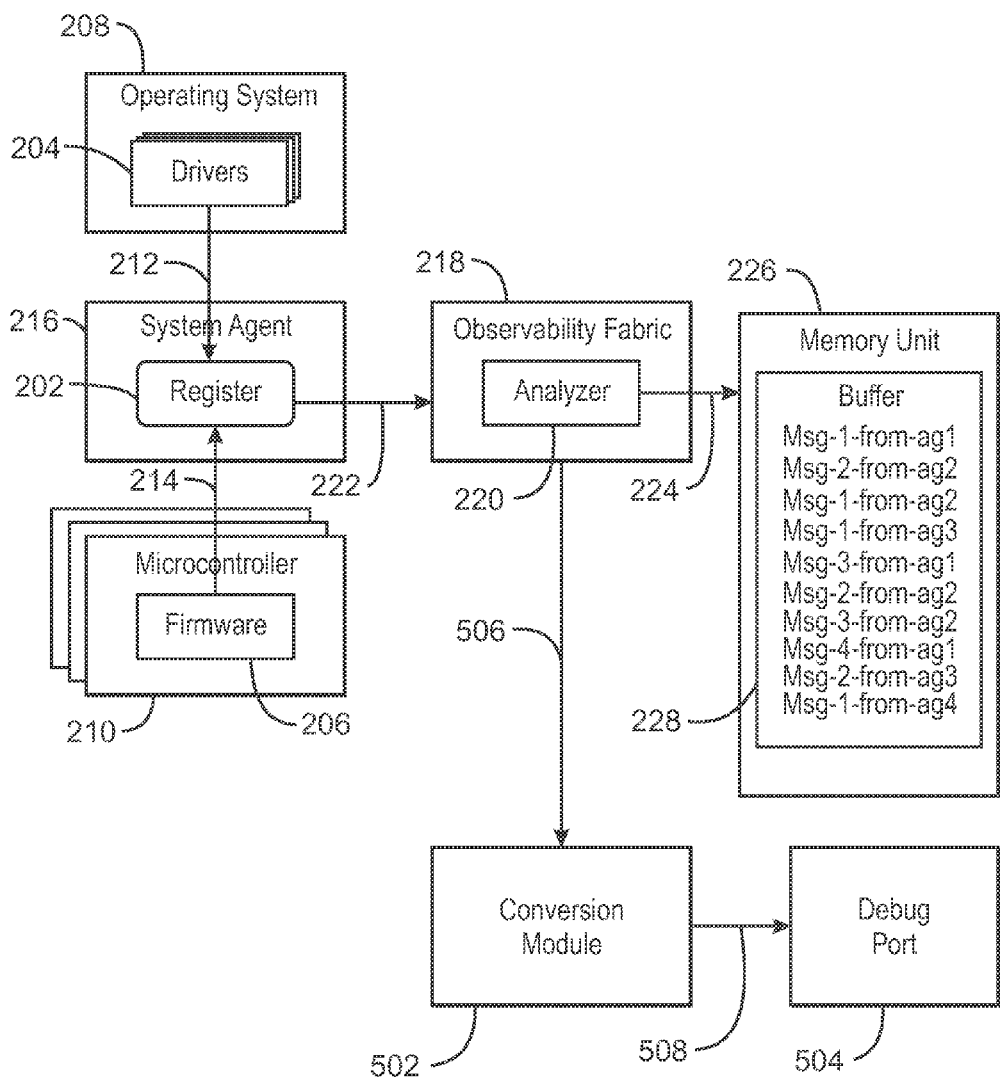
FIG. 5 is a block diagram illustrating a computing system and a conversion module to capture debug data.

FIG. 5 is a block diagram illustrating a computing system and a conversion module to capture debug data. The computing system illustrated in FIG. 5 may be the computing system 200 discussed above in reference to FIG. 2 modified to include a conversion module 502. The conversion module 502 may be logic, at least partially comprising hardware logic, configured to capture a snapshot of debug information. The conversion module 502 records captured debug data in a register (not shown) in the conversion module 502. The captured debug data is provided to a debug port 504. The debug port 504 is associated with a debug logic having a serial pin, such as JTAG logic discussed above. The debug port 504 may, therefore, be a serial pin such as the test data out (TDO) pin associated with the JTAG logic.

As illustrated in FIG. 5, the conversion module 502 captures a snapshot of the debug data as indicated by the arrow 506. In embodiments, the debug data captured from the observability fabric 218 is associated with a first clock frequency of the observabilty fabric 218. The conversion module 502 is associated with a second clock frequency that is different from the first clock frequency. The conversion module 502 is configured to capture a sample of the debug data, such as one byte of debug data, from the observabilty fabric 218 and convert the debug data from the first clock frequency to the second clock frequency. The captured data may be a discrete sampling of the debug data enabling a quick solution to observing the debug data, without having to store the debug data in the memory unit 226.

For example, one byte of debug data may be captured from observability fabric 218 having a clock frequency of 400 MHz. The conversion module 502 may have a clock frequency of 10 MHz associated with debug logic such as the JTAG debug logic discussed above in reference FIG. 3. Therefore, the capture of debug data at the conversion module 502 includes converting the debug data from a clock domain associated with the observability fabric 218 to a clock domain associated with the conversion module 502.

In embodiments, the debug data captured at 506 is in parallel with the debug data provided at 224 to the memory unit 226. At 508, the debug data is provided serially to a debug port 504 such that debug data may be observed discretely and serially by providing a byte of debug data in series. In embodiments, the debug data is captured prior to being provided to the analyzer 220 of the observabilty fabric 218.

In embodiments, debug data is captured and converted by the conversion module 502 in response to a query initiated in the operating system 208, or via an external hardware device such as the external hardware device 302 discussed above in reference to FIG. 3 and/or FIG. 4. In embodiments, the query indicates a given core or location of the observability fabric 218 such that debug data is analyzed for a given component.

Figure 6:
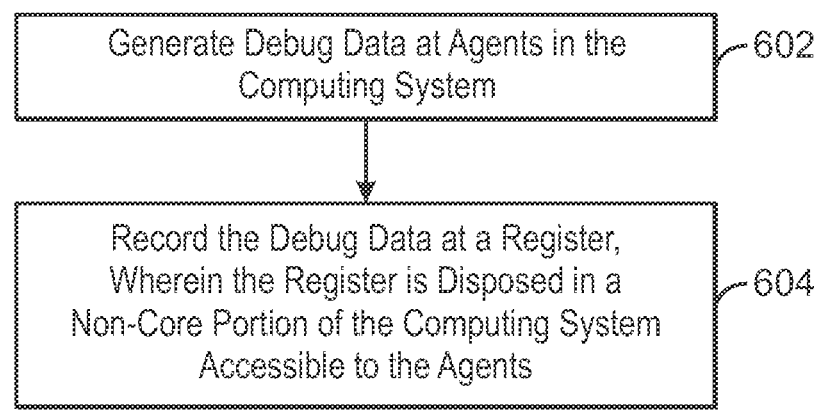
FIG. 6 is a block diagram illustrating a method for receiving debug data in a register.

FIG. 6 is a block diagram illustrating a method for receiving debug data in a register. The method 600, at block 602, generates debug data at agents in the computing system. The agents include firmware agents and driver agents. The firmware agents and the driver agents are configured to have access to a non-core register configured record the debug data. The method 600 includes recording, at block 604, the debug data at the register disposed in a non-core portion of the computing system.

In some embodiments, recording the debug data at the register comprises writing the debug data in a protocol within the register such that a debug mechanism, such as the external hardware debug mechanisms or the operating system based debug mechanisms discussed above in reference to FIG. 3 and FIG. 4, respectively. In embodiments, the agents provide XML documents describing the debug data provided to the register such that the debug data may be recorded within the register properly.

In some embodiments, the method 600 includes capturing debug data such that a snapshot of the debug data is received at a conversion module, such as the conversion module 502 discussed above in reference to FIG. 5. In this scenario, the method 500 captures the debug data a first clock frequency associated with the observabilty fabric and convert the data to a frequency domain of a second clock frequency associated with a debug mechanism, such as a frequency clock of the external debug hardware 302 of FIG. 3, or the debug driver 402 of FIG. 5.

Figure 7:
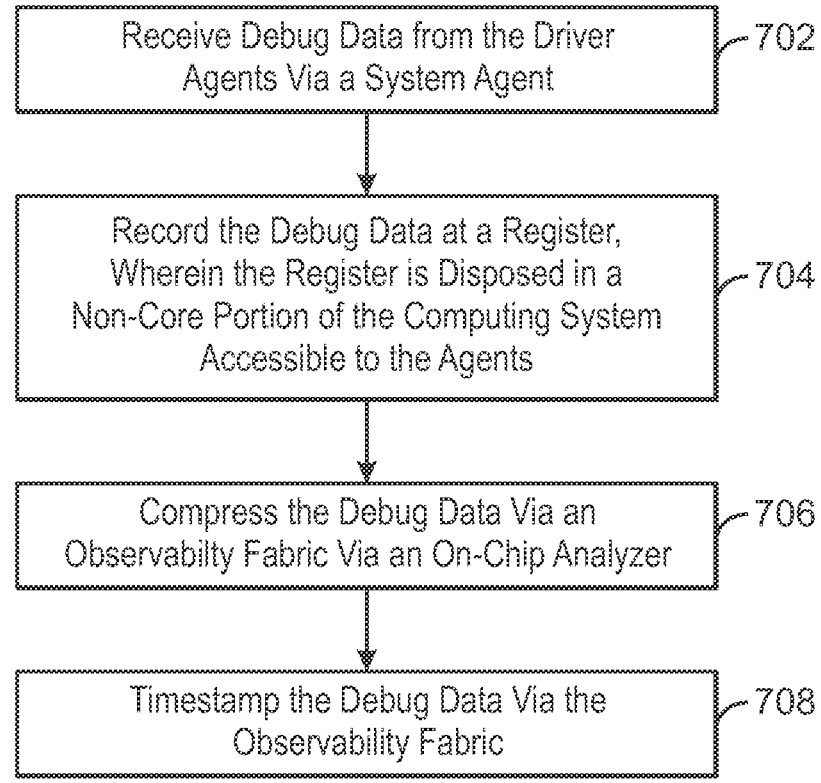
FIG. 7 is a block diagram illustrating a method for receiving debug data in a register and compressing and timestamping the debug data.

FIG. 7 is a block diagram illustrating a method for receiving debug data in a register and compressing and timestamping the debug data. The method 700, at block 702, debug data is received from the driver agents via a system agent. The agents include firmware agents and driver agents. The firmware agents and the driver agents are configured to have access to a non-core register configured record the debug data. The method 700 includes providing, at block 704, the debug data from the driver agents to the register. At block 706, the debug data is compressed via an observability fabric and on-chip analyzer. The debug data is timestamped, at block 708, via the observability fabric. The compressed and timestamped data may be useful in discerning the origin of the debug data upon analysis.

Figure 8:
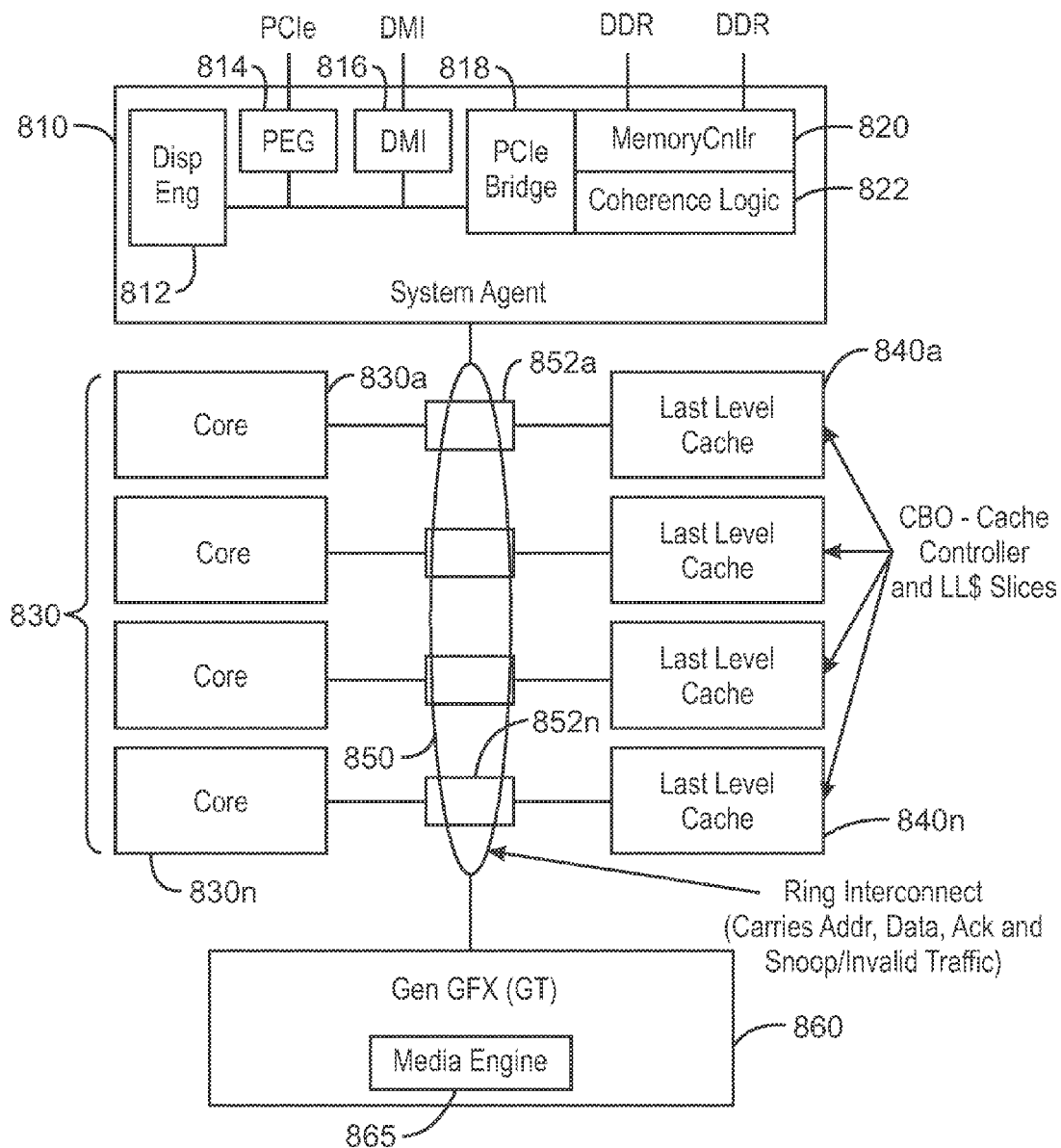
FIG. 8 is a block diagram of an embodiment of a multicore processor in accordance with the embodiments described herein.

Referring now to FIG. 8, shown is a block diagram of an embodiment of a multicore processor. As shown in the embodiment of FIG. 8, processor 800 includes multiple domains. Specifically, a core domain 830 includes a plurality of cores 830A-830N, a graphics domain 860 includes one or more graphics engines having a media engine 865, and a system agent domain 810.

In various embodiments, system agent domain 810 handles power control events and power management, such that individual units of domains 830 and 860 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 830 and 860 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 830 further includes low level caches in addition to various execution units and additional processing elements. Here, the various cores are coupled to each other and to a shared cache memory that is formed of a plurality of units or slices of a last level cache (LLC) 840A-840N; these LLCs often include storage and cache controller functionality and are shared amongst the cores, as well as potentially among the graphics engine too.

As seen, a ring interconnect 850 couples the cores together, and provides interconnection between the core domain 830, graphics domain 860 and system agent circuitry 810, via a plurality of ring stops 852A-852N, each at a coupling between a core and LLC slice. As seen in FIG. 8, interconnect 850 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 810 includes display engine 812 which is to provide control of and an interface to an associated display. System agent domain 810 may include other units, such as: an integrated memory controller 820 that provides for an interface to a system memory (e.g., a DRAM implemented with multiple DIMMs; coherence logic 822 to perform memory coherence operations. Multiple interfaces may be present to enable interconnection between the processor and other circuitry. For example, in one embodiment at least one direct media interface (DMI) 816 interface is provided as well as one or more PCIe™ interfaces 814. The display engine and these interfaces typically couple to memory via a PCIe™ bridge 818. Still further, to provide for communications between other agents, such as additional processors or other circuitry, one or more other interfaces (e.g. an Intel® Quick Path Interconnect (QPI) fabric) may be provided.

Figure 9:
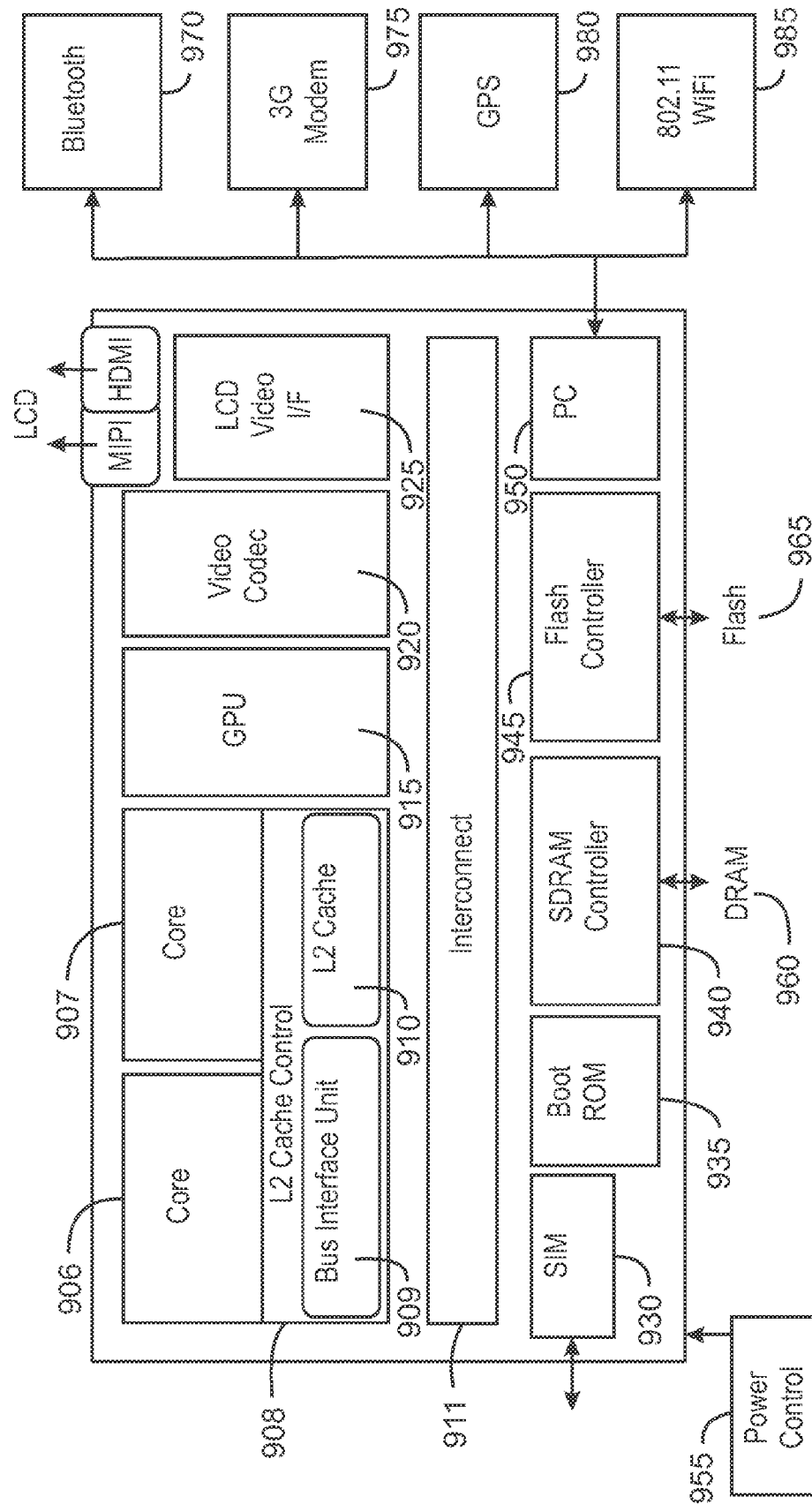
FIG. 9 illustrates an embodiment of a system on-chip (SOC) design in accordance with the embodiments described herein.

Turning next to FIG. 9, an embodiment of a system on-chip (SOC) design in accordance with the inventions is depicted. As a specific illustrative example, SOC 900 is included in user equipment (UE). In one embodiment, UE refers to any device to be used by an end-user to communicate, such as a handheld phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes 2 cores—906 and 907. Similar to the discussion above, cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnect discussed above, which potentially implements one or more aspects of the described invention.

Interface 911 provides communication channels to the other components, such as a Subscriber Identity Module (SIM) 930 to interface with a SIM card, a boot ROM 935 to hold boot code for execution by cores 906 and 907 to initialize and boot SOC 900, a SDRAM controller 940 to interface with external memory (e.g. DRAM 960), a flash controller 945 to interface with non-volatile memory (e.g. Flash 965), a peripheral control Q1650 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the invention described herein.

In addition, the system illustrates peripherals for communication, such as a Bluetooth module 970, 3G modem 975, GPS 985, and WiFi 985. Note as stated above, a UE includes a radio for communication. As a result, these peripheral communication modules are not all required. However, in a UE some form a radio for external communication is to be included.

EXAMPLE 1

A method of debugging a computing system using a non-core system register, or register means, is described herein. The register means may include a register of accessible by a system agent of the computing device, wherein the system agent is a non-core component of the computing device. Debug data may be generated at agents in the computing system including agents of firmware devices and agents of system software such as drivers of the computing system. The agents have access to the register means, and the register may accessible via a observability fabric means, such as a system interconnect fabric, to enable debug data to be stored in a memory unit and analyzed by debug software and/or hardware. The observability fabric means may include an on-chip analyzer configured to compress and time stamp the debug data.

EXAMPLE 2

An apparatus is described herein. The apparatus may be configured to receive debug data at a non-core register, or register means. The register may be configured to record the debug data and a memory unit, or memory means, may be configured to receive the debug data via an interconnect fabric, such as an observability fabric, or observability fabric means. The memory unit may store the debug data and may be accessible by debug software and/or hardware to determine the source of the debug data. In embodiments, the interconnect fabric may include analyzer logic, such as an on-chip analyzer, to compress and timestamp the data to be received at the memory unit. The agents may include driver agents of an operating system and/or firmware agents of microcontrollers communicatively coupled to the system. In embodiments, the agents, such as the firmware agents, may have access to the register via a computing system interconnect means, such as the observability fabric discussed above.

EXAMPLE 3

A computing device is described herein. The computing device may include a driver agent, a firmware agent, and a register means. The driver agent may be driver logic that is accessible by driver code to be exected on a processing element. The driver agent is associated with an operating system of the computing device to generate debug data. The firmware agent may be controller logic to provide second debug data for one or more controllers. The register means, may be a register, or a storage element, disposed in a non-core portion of the computing device, wherein the firmware agents and the driver agents may provide debug data to the register. The register may be configured to record the debug data and a memory unit, or memory means, may be configured to receive the debug data via an interconnect fabric, such as an observability fabric, or observability fabric means. The memory unit may store the debug data and may be accessible by debug software and/or hardware to determine the source of the debug data. In embodiments, the interconnect fabric may include analyzer logic, such as an on-chip analyzer, to compress and timestamp the data to be received at the memory unit. The agents may include driver agents of an operating system and/or firmware agents of microcontrollers communicatively coupled to the system. In embodiments, the agents, such as the firmware agents, may have access to the register via an computing system interconnect means, such as the observability fabric discussed above.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of debugging a computing system, comprising:
   generating debug data at agents in the computing system, wherein the agents comprise both a firmware agent and a driver agent; and
   recording the debug data at a storage element, wherein the storage element is disposed in a non-core portion of the computing system accessible to the each of the firmware agent and the driver agent.

2. The method of claim 1, wherein recording the debug data the storage element comprises writing the debug data in a protocol within the storage element such that a debug mechanism can decode the debug data.

3. The method of claim 1, comprising:
   compressing the debug data via an observabilty fabric via an on-chip analyzer; and
   timestamping the debug data via the observabilty fabric.

4. The method of claim 1, wherein the agents comprise:
   driver agents of an operating system;
   firmware agents of microcontrollers communicatively coupled to the system; and
   any combination thereof.

5. The method of claim 4, comprising:
   receiving debug data from the driver agents via a system agent; and
   providing the debug data from the driver agents to the storage element.

6. The method of claim 4, comprising providing the debug data from the firmware agents to the storage element via an observabilty fabric.

7. The method of claim 1, comprising:
   storing the debug data in a memory unit; and
   communicating debug data in the memory unit to a debug module of an operating system associated with at least some of the agents.

8. The method of claim 1, comprising:
   storing the debug data in a memory unit; and
   communicating debug data in the memory unit to a debug module of an operating system associated with at least some of the agents via an external hardware device connectable to a DRAM and connectable to the debug module; and
   any combination thereof.

9. The method of claim 1, comprising:
   capturing debug data at a first clock frequency associated with an observability fabric communicatively coupled to the storage element;
   converting the first clock frequency to a second clock frequency associated with a debug mechanism; and
   receiving the debug data at the converted clock frequency at the debug mechanism.

10. A system, comprising a storage element to aggregate and record debug data from a plurality of agents having logic, at least partially comprising hardware logic, to generate debug data, wherein the storage element is disposed in a non-core portion of the apparatus, and wherein the aggregated debug data comprises debug data from two or more different agent types.

11. The system of claim 10, comprising a memory unit to:
    receive the debug data via an observabilty fabric; and
    store the debug data.

12. The system of claim 10, wherein the debug data is written in a protocol within the storage element such that a debug mechanism can decode the debug data.

13. The system of claim 10, wherein the observabilty fabric comprises an on-chip analyzer to compress and timestamp the debug data.

14. The system of claim 10, wherein the agents comprise;
    driver agents of an operating system;
    firmware agents of microcontrollers communicatively coupled to the system; and
    any combination thereof.

15. The system of claim 14, comprising a system agent to receive debug data from the driver agents and to provide the debug data from the driver agents to the storage element.

16. The system of claim 14, comprising an interconnect, wherein the debug data from the firmware agents is provided to the storage element via the interconnect.

17. The system of claim 10, comprising a debug mechanism to receive the debug data stored in DRAM, wherein the debug mechanism comprises:
    a debug module of the computing device such that the DRAM is visible to an operating system of the device;
    an external hardware device connectable to the DRAM and connectable to the debug module; and
    any combination thereof.

18. The system of claim 10, comprising a conversion module to:
- capture debug data at a first clock frequency associated with an observability fabric communicatively coupled to the storage element;
- convert the first clock frequency to a second clock frequency associated with a debug mechanism; and
- receive the debug data at the converted clock frequency at the debug mechanism.

19. A computing device, comprising:
- a processing element;
- driver logic that is to be accessible by driver code to be executed on the processing element, the driver logic to provide first debug data;
- controller logic to provide second debug data for one or more controllers; and
- a storage element to be accessible to the driver logic and the controller logic, the storage element to record the first and second debug data, wherein the storage element is disposed in a non-core portion of the computing device.

20. The computing device of claim 19, comprising:
- an observabilty fabric to compress and timestamp the debug data; and
- a memory unit to:
  - receive the debug data via the observabilty fabric; and
  - store the debug data.

21. The computing device of claim 19, wherein the debug data is written in a protocol within the storage element such that a debug mechanism can decode the debug data.

22. The computing device of claim 19, comprising:
- a system agent to receive debug data from the driver logic and to provide the debug data from the driver logic to the storage element; and
- an interconnect, wherein the debug data from the controller logic is provided to the storage element via the interconnect.

23. The computing device of claim 19, comprising a debug mechanism to receive the debug data stored in DRAM, wherein the debug mechanism comprises:
- a debug module of the computing device such that the DRAM is visible to an operating system of the device;
- an external hardware device connectable to the DRAM and connectable to the debug module; and
- any combination thereof.

24. The computing device of claim 19, comprising a conversion module to:
- capture debug data at a first clock frequency associated with an observability fabric communicatively coupled to the storage element;
- convert the first clock frequency to a second clock frequency associated with a debug mechanism; and
- receive the debug data at the converted clock frequency at the debug mechanism.

25. A non-transitory computer readable medium including code, when executed, to cause a processing device to:
- generate driver debug data associated with a driver for a driver agent in the processing device;
- generate controller debug data associated with a controller agent in the processing device; and
- aggregate the driver debug data and the controller debug data in a storage element within a non-core portion of the processing device.

* * * * *